United States Patent
Souter et al.

(10) Patent No.: US 10,235,903 B2
(45) Date of Patent: Mar. 19, 2019

(54) SIMULATOR FOR TRAINING MEDICAL PERSONNEL TO PERFORM UTERINE PROCEDURES

(71) Applicants: Vivienne Souter, Seattle, WA (US); Morag McLean, Amsterdam (NL)

(72) Inventors: Vivienne Souter, Seattle, WA (US); Morag McLean, Amsterdam (NL)

( * ) Notice: Subject to any disclaimer, the term of this patent is extended or adjusted under 35 U.S.C. 154(b) by 251 days.

(21) Appl. No.: 15/132,002

(22) Filed: Apr. 18, 2016

(65) Prior Publication Data

US 2017/0301263 A1    Oct. 19, 2017

(51) Int. Cl.
*G09B 23/28* (2006.01)
*G09B 23/30* (2006.01)

(52) U.S. Cl.
CPC .......... *G09B 23/281* (2013.01); *G09B 23/30* (2013.01)

(58) Field of Classification Search
USPC .......................... 434/262, 267, 268, 272, 273
See application file for complete search history.

(56) References Cited

U.S. PATENT DOCUMENTS

| | | | | |
|---|---|---|---|---|
| 3,890,723 | A * | 6/1975 | Haurat | G09B 23/30 428/16 |
| 5,061,187 | A * | 10/1991 | Jerath | G09B 23/286 434/262 |
| 5,472,345 | A * | 12/1995 | Eggert | G09B 23/281 434/273 |
| 5,518,407 | A * | 5/1996 | Greenfield | G09B 23/30 434/267 |
| 6,247,935 | B1 * | 6/2001 | Martin | A63B 69/12 434/247 |
| 7,553,159 | B1 * | 6/2009 | Arnal | G09B 23/281 434/267 |
| 7,651,332 | B2 * | 1/2010 | Dupuis | G09B 23/281 434/262 |
| 9,830,834 | B2 * | 11/2017 | Miyazaki | G09B 23/34 |
| 2005/0100872 | A1 * | 5/2005 | Hoster, Jr. | G09B 19/00 434/262 |
| 2006/0121429 | A1 * | 6/2006 | Mazloompour | A63B 69/0097 434/247 |
| 2008/0113324 | A1 * | 5/2008 | Ishii | A61B 17/00 434/272 |

(Continued)

*Primary Examiner* — Kurt Fernstrom
(74) *Attorney, Agent, or Firm* — McAndrews, Held & Malloy, Ltd.

(57) ABSTRACT

The surgical simulator contains a one-piece simulated uterus having a uterine fundus and body. A rigid hollow support base has a recess in its support surface that is complementary to the shape of at least a portion of the uterine fundus and body so that at least a posterior portion of the uterine fundus and body fit securely into the recess to retain the simulated uterus in position during use. Liquid can be introduced into the base to add weight, and the liquid can be heated to heat the simulated uterus to body temperature. The base can also provide a rigid hard tissue component that simulates the surface topography of the pelvic bone, portion of the spine, hip joints and heads of the femurs. The hard tissue component can be encased in an elastomeric material that simulates muscles and skin to practice obstetric procedures such as a C-section, insertion of an intrauterine tamponade balloon, insertion of an intrauterine contraceptive device, or insertion of compression sutures such as the B-Lynch suture.

22 Claims, 7 Drawing Sheets

(56) References Cited

U.S. PATENT DOCUMENTS

| | | | |
|---|---|---|---|
| 2011/0091855 A1* | 4/2011 | Miyazaki | G09B 23/281 |
| | | | 434/267 |
| 2011/0200976 A1* | 8/2011 | Hou | G09B 23/32 |
| | | | 434/267 |
| 2012/0015339 A1* | 1/2012 | Hendrickson | G09B 23/303 |
| | | | 434/268 |
| 2014/0051049 A1* | 2/2014 | Jarc | G09B 23/30 |
| | | | 434/267 |
| 2014/0248596 A1* | 9/2014 | Hart | G09B 23/30 |
| | | | 434/272 |
| 2015/0132733 A1* | 5/2015 | Garvik | G09B 23/285 |
| | | | 434/273 |

* cited by examiner

SIMULATOR FOR TRAINING MEDICAL PERSONNEL TO PERFORM UTERINE PROCEDURES

FIELD OF THE INVENTION

A uterine simulation device is disclosed that mimics the texture and shape of a uterus. The simulator is useful for training medical personnel to perform obstetric and surgical procedures.

BACKGROUND OF THE INVENTION

Medical personnel must combine anatomic knowledge with practical motor skills to perform surgical and other invasive procedures. Although a knowledge of anatomy is essential to perform a surgical procedure, that anatomic knowledge must be combined with motor skills that are best learned by practice and repetition. Surgeons in the past generally learned to perform surgery almost exclusively by practicing techniques under the guidance of a more experienced surgeon. Such personal instruction has been supplemented in recent years by the development of surgical simulators that allow medical personnel to practice surgical techniques without the risk and potential morbidity associated with practicing such techniques on live patients or animals.

For example, U.S. Pat. No. 6,780,016 discloses a human surgical training device that includes an anatomically correct model of the human thorax and neck. The model is made of an elastomeric material that mimics layers of skin, subcutaneous fat, muscle layers and peritoneum. Simulated organs are placed within the cavity formed by the elastomeric material and simulated body fluids are contained within the organs and body cavity. Procedures such as peritoneal lavage, chest tube insertion, pericardiocentesis and cricothyroidotomy can be practiced on the training device.

Another training device is disclosed in US 2012/0015337, in which an artificial body wall is made of multiple layers of silicone rubber that mimic the epidermis-dermis layers. One of the layers contains artificial blood vessels that simulate bleeding when a student makes a practice incision in it. US 2012/0015339 discloses a simulated organ, such as a liver or spleen, that is formed of platinum cured room temperature vulcanization silicone rubber that provides a substrate that can be incised and sutured by a student practicing the technique. U.S. Patent Publication No. 2009/5 0226868 describes a surgical or endoscopic practice model of an elongated organ such as the intestines in which an inner elastomeric lumen is surrounded by a surrounding outer elastomeric lumen that contains a fluid to mimic natural anatomic pressures on the inner lumen.

U.S. Pat. No. 7,866,983 discloses a simulator for teaching surgical techniques. The simulator is a cassette of organs, blood vessels and tissues, such as those found in the female reproductive tract. A programmable computer-implemented hemodynamic simulator moves pressurized fluid through simulated arteries and veins in the cassette. The simulator is programmed to provide variable pulse and blood pressure rates.

A variety of training devices have been developed for practicing gynecologic and obstetric procedures and surgeries. For example, U.S. Patent Publication No. 2007/0172804 describes a maternal/fetal birth simulator having a rotatable pelvis, articulated legs, and a deformable covering that simulates the feel of the skin and underlying tissues. A hydraulic uterine propulsive system also simulates the birth of a fetus through a simulated birth canal of the device. WO 03/041034 discloses an interactive, computerized simulator to train students to deliver babies. Computer simulated contractions of an elastomeric flexible uterus simulator push a model of a fetus from the uterus and through an artificial vaginal canal seated in a model of the pelvis. U.S. Pat. No. 5,318,448 discloses transparent generally cylindrical tubing hingedly attached to a rigid platform. The tubing simulates the vaginal canal of a patient such that a speculum or other gynecological instrument may be inserted through the tubing to practice gynecologic procedures.

U.S. Pat. No. 7,553,159 discloses an abdominopelvic surgical training model that is particularly adapted for training surgeons such as urologists in the treatment of stress urinary incontinence with a urethral sling procedure. A mass of elastomeric material encases a skeletal frame of the pelvis to provide simulated layers of pliant, elastic and penetrable elastomers that have a realistic density and consistency. U.S. Pat. No. 5,472,345 discloses a gynecological simulator for training medical personnel. The simulator incorporates a flexible vagina having a proximal end fixed to the body and a distal end attached to a securely retained cervix and rotatable uterus with fallopian tubes. Artificial skin encases the simulator and can be incised to permit simulated laparoscopy or mini-laparotomy to be performed. U.S. Patent Publication No. 2011/0269109 discloses a three-dimensional open-top model of the pelvis and its internal anatomy that is mounted on a spindle for rotation around a horizontal axis.

Many of these devices are complex and expensive, which makes them less suitable for educational purposes. They also lack structural features that provide tactile realism or otherwise make them suitable as a substrate to practice suturing. Similarly they lack structural features that enable them to be incised and sutured at multiple locations on a simulated uterus, or to be re-used in an economical manner. Many prior devices also lack the portability and stability that would be useful in a surgical training device to be used in an educational setting.

It is therefore an object of the present disclosure to provide a simulation training device that has the potential to overcome one or more of such problems.

BRIEF SUMMARY OF THE INVENTION

Several embodiments of a simulator are disclosed that enable medical personnel to practice medical and surgical procedures, and particularly obstetric and gynecologic procedures. The simulator incorporates a simulated uterus that is made of a material that mimics the natural texture of the human uterus, and is suitable to be incised and sutured. In some embodiments the materials can also be reinforced with a mesh net (such as four-way stretch tulle netting) to facilitate suturing of the material after it is incised, or the material is heated to further simulate physiologic conditions that medical personnel would encounter when performing a procedure on the uterus. The simulator can be used to simulate surgical techniques for cesarean delivery and multiple procedures used in the management of uterine hemorrhage. In some embodiments the materials are compressible to simulate uterine hemostatic suturing techniques (such as the placement of B-Lynch sutures) for the treatment of uterine hemorrhage. The simulator is compact, easily transported and reusable. In some embodiments the uterus is made from a material that transmits ultrasound or is ultrasound lucent. This allows simulation of ultrasound-guided procedures including simulation of uterine exploration and curettage, simulation of placement of an intrauterine contraceptive device, and simulation of the placement of an intrauterine balloon for tamponade.

In one embodiment, the simulator includes a one-piece simulated uterus having a uterine fundus and body, and a rigid hollow base having a recess in a support surface. The recess is complementary to the shape of at least a portion of the uterine fundus and body for holding the simulated uterus, for example by engaging or enclosing a portion of a posterior depth of the artificial uterus. A port in the base can be selectively opened to permit the introduction of a liquid into the interior of the base, and selectively closed to retain the liquid therewithin. When the liquid is present inside the base the liquid selectively increases the weight of the base which stabilizes the base, holding the simulated uterus in position while a medical procedure is performed with the simulator. The liquid can also be heated to a temperature that warms the simulated uterus, for example to a temperature above 25° C., such as body temperature (about 37° C.), which facilitates the educational tactile sensation provided to a clinician practicing medical or surgical procedures with the simulator.

In some embodiments the uterus includes uterine arteries. This allows simulation of placing one or more sutures to ligate the uterine artery (including but not limited to the "O'Leary suture"), an important technique in the management of postpartum hemorrhage. In some embodiments the uterus comprises an anterior cervical lip. This allows the cervix to be grasped with an instrument (a sponge forceps in most cases) to simulate uterine exploration and curettage, placement of uterine packing, placement of an intrauterine contraceptive device, and placement of an intrauterine balloon for tamponade, In some embodiments the uterus includes fallopian tubes for simulation of techniques for permanent female sterilization such as tubal ligation.

The simulated uterus can take many forms, such as a simulation of an enlarged or bulb-shaped gravid or post-partum uterus. The body of the simulated post-partum uterus has a generally ovoid shape in both horizontal and vertical cross-section, an externally convex outer surface, and a generally concave inner surface. The post-partum uterus would not contain a simulated fetus within it. The simulated uterus can include at least a portion of a simulated isthmus of two fallopian tubes projecting outwardly from the junction of the uterine fundus and body, and can include both fallopian tubes. The recessed support surface also comprises a recessed portion that is complementary to a shape of the simulated isthmus of the two fallopian tubes. A simulated vagina can extend from the internal os of the simulated uterus, and the recess in the support surface further comprises a portion complementary to the shape of at least a posterior aspect of the simulated vagina. A fabric mesh can also be included in a wall of the uterine body, such as the anterior wall, to facilitate repeated incision and suturing of the uterine body. The fabric mesh can also be placed in both the anterior and posterior wall of the simulated uterus, or extend circumferentially around the body of the uterus, so that the simulated uterus can be reused by rotating it 180 degrees around its longitudinal axis so that the anterior and posterior faces of the simulated uterus are reversed.

The simulated uterus can be made of an elastomeric silicone rubber material having a texture similar to human tissue, and the material may be made latex-free. A particularly disclosed material is a platinum-catalyzed room temperature vulcanization silicone rubber having a Shore A durometer hardness of less than 10. In particular embodiments the Shore A hardness is less than 5, for example is it about 2 or less, to simulate the texture of the uterus when practicing surgical procedures on the simulator. The soft pliable material of the simulated uterus also permits it to be readily compressed when practicing compression sutures, such as a suture that loops from the lower uterine body, over the fundus, and back to the opposing face of the lower uterine body. The pliability of the simulated uterus also allows it to be bent up and out of its cradle to access the posterior face of the uterus when practicing obstetric procedures.

The base of the simulator can take a variety of forms. For example, the base can be a substantially hollow enclosure, and its support surface includes a top surface of the base for supporting the simulated uterus. The base also has a substantially flat bottom surface for placement on a work surface, and a continuous sidewall that extends around the base between the top and bottom surfaces. A port is located in the sidewall and is selectively closed by a removable cap that mates with the port. The base can be a free-standing exposed component or it can be part of a rigid human abdominopelvic simulator that simulates the bony anatomic topography of the abdominopelvic area. For example, the base can simulate one or more of: a surface of a pelvic bone, sacrum and coccyx, a portion of the lumbar spine, hip joints and heads of the femurs. An elastomeric covering of the rigid base can simulate muscles and soft tissue. In one example, the simulated soft tissue includes a simulated layer of abdominal skin over the layer of simulated muscles and soft tissue.

In some embodiments the simulator comprises a one-piece simulated uterus comprising a uterine fundus and body; a rigid hollow base having a recess in a support surface, wherein the recess is complementary to the shape of at least a portion of the uterine fundus and body for holding the simulated uterus to a portion of a posterior depth of the artificial uterus; a port in the base that can be selectively opened to permit the introduction of a liquid into the base, and selectively closed to retain the liquid within the base, to selectively increase a weight of the base to stabilize the base and simulated uterus in a desired position.

In some embodiments the simulated uterus comprises a simulated gravid or post-partum uterus.

In some embodiments the simulated uterus further comprises at least a portion of a simulated isthmus of two fallopian tubes projecting outwardly (laterally) from the junction of the uterine fundus and body on the anatomical left and right sides of the simulated uterus, and the recessed support surface also comprises a recessed portion that is complementary to a shape of the simulated isthmus of the two fallopian tubes.

In some embodiments the simulated uterus includes fallopian tubes projecting outwardly (laterally) from the junction of the uterine fundus and body on the anatomical left and right sides of the simulated uterus.

In some embodiments the simulated uterus further comprises a fabric mesh in an anterior wall of the uterine body that facilitates repeated incision and suturing of the uterine body.

In some embodiments the simulated uterus further comprises a simulated vagina extending from the body of the simulated uterus, and the recess in the support surface further comprises a portion complementary to the shape of at least a posterior portion of the simulated vagina.

In some embodiments the simulated uterus comprises an elastomeric silicone rubber having that provides a texture of the simulated uterus similar to human tissue. In yet another embodiment the elastomeric silicone rubber comprises a platinum-catalyzed room temperature vulcanization silicone rubber having a Shore A durometer hardness 5 of less than 10

In some embodiments the simulated uterus contains no latex.

In some embodiments the base of the simulated uterus is a substantially hollow enclosure and the support surface comprises a top surface of the base for supporting the simulated uterus, a substantially flat bottom surface, and a continuous sidewall that extends between the top and bottom surfaces, wherein the port is located in the sidewall and is selectively closable by a removable cap that mates with the port.

In some embodiments the simulated uterus is bulb-shaped.

In some embodiments the base of the simulated uterus comprises a rigid human abdominopelvic simulator that simulates a surface of a pelvic bone, sacrum and coccyx, a portion of the lumbar spine, hip joints and heads of the femurs.

In some embodiments the simulated uterus further comprises an elastomeric covering of the rigid base comprising simulated muscles and soft tissue. In yet another embodiment the simulated soft tissue comprises a simulated layer of skin that has a Shore A hardness of less than the Shore A hardness of the simulated uterus.

In some embodiments the simulated uterus has a Shore A hardness of about 2.

In some embodiments the simulated uterus further comprises a liquid in the base that stabilizes the base during use of the simulator but can be removed to selectively decrease weight of the simulator. In yet another embodiment the liquid is heated to a temperature above 25° C. to warm the simulated uterus, for example substantially to body temperature.

In some embodiments the simulated uterus comprises a chemically cross-linked silicone rubber or polyurethane elastomer that transmits ultrasound or is ultrasound lucent. In yet another embodiment the simulated uterus has a hardness between Shore 00: 35 to Shore A: 10.

The disclosed device can be used in methods of practicing or simulating medical and surgical procedures, as in the training of medical personnel and residents to perform obstetric and gynecological procedures. In use, the port of the base can be opened to introduce a liquid (such as water) into the base to increase its weight and stabilize the simulator for use. The liquid is heated to a temperature above 25° C. to conductively warm the simulated uterus supported by the base, for example warming the water and/or simulated uterus substantially to body temperature. The simulated uterus can be incised and/or sutured to simulate such procedures as a cesarean delivery (c-section) incision using a transverse, classical (vertical) or T-shaped incision, performance of uterine massage, performance of bimanual uterine compression, repair of uterine rupture, performance of uterine curettage, exploration of the uterine cavity, placing of sutures in the placental bed, repair of inner myometrial lacerations, insertion of uterine hemostatic suturing or compression sutures (including but not limited to the B-Lynch suture) and placement of arterial ligation sutures (including but not limited to O'Leary sutures) in and/or around the simulated uterus, insertion of an intrauterine balloon for uterine tamponade into the simulated uterus through an incision in the uterus or through the simulated vagina, placement of a cervical cerclage, insertion of intrauterine packing, and insertion of vaginal packing. In other embodiments the simulated uterus can be used to simulate intrauterine contraceptive device (IUCD) placement through an incision in the uterus (simulating intrauterine contraceptive device placement at the time of cesarean delivery or hysterotomy) or placement through the simulated vagina to simulate postpartum IUCD placement via a vaginal approach. In some embodiments, ultrasound guidance can be used during the simulation of these procedures including simulation of the placement and inflation of an intrauterine balloon for uterine tamponade, simulation of the placement of an intrauterine contraceptive device, and simulation of uterine exploration and curettage. When using embodiments of the base that include abdominopelvic features and/or soft tissue, the simulated procedures can include incising the simulated skin and underlying simulated tissues to tactilely or visually locate the simulated uterus within the simulator. It can be used to simulate incision of the uterus (through a vertical or transverse of T-shaped incision) and to simulate surgical closure of the uterus, overlying soft tissues and skin.

The simulated vagina can be secured to the base by a strap or hinge that retains the vagina near the base while the body of the uterus is lifted off the base. Securing the lower portion of the simulated uterus to the base facilitates bending the body of the uterus away from the underlying base when practicing procedures (such as a B-Lynch compression suture) in which the suture is looped around the posterior face of the body of the uterus and over the fundus to the anterior face of the uterus.

In some embodiments the simulated uterus can be used by selectively opening the port to introduce a liquid into the base to selectively increase weight of the simulator to stabilize the simulator for use. In yet another embodiment the liquid is heated to a temperature above 25° C. to warm the simulated uterus, for example substantially to body temperature.

In some embodiments the simulated uterus can be used by incising and/or suturing the simulated uterus. In yet another embodiment the simulated uterus can be used to simulate one or more of: performing a simulated cesarean delivery incision (either vertical or transverse or T-shaped incision); performing surgical closure of the incision (s) in the simulated uterus; performing repair of a uterine rupture; performing uterine massage, placing compression sutures in and/or around the simulated uterus; inserting an intrauterine tamponade balloon into the simulated uterus; placing of uterine artery ligation sutures in and around the simulated uterus; exploring the uterine cavity; repairing inner myometrial lacerations in the simulated uterus; inserting placental bed sutures in the simulated uterus; performing curettage of the simulated uterus; inserting intrauterine packing into the simulated uterus; insertion of vaginal packing into the simulated vagina; insertion of an intrauterine contraceptive device either through an incision in the simulated uterus or through the simulated vagina; placing a transabdominal cervical cerclage into the simulated uterus.

In some embodiments ligation techniques of the fallopian tubes for female sterilization can be simulated.

In some embodiments ultrasound guidance can be used for the simulation of surgical techniques including placement and inflation of an intrauterine balloon for tamponade, uterine exploration and curettage, and placement and of an intrauterine contraceptive device.

In some embodiments the simulated uterus can be used by incising and/or suturing the overlying simulated skin and soft tissues encountered in human anatomy before accessing the simulated uterus.

The foregoing and other objects, features, and advantages of the invention will become more apparent from the following detailed description, which proceeds with reference to the accompanying figures.

DETAILED DESCRIPTION OF THE INVENTION

Terms

Figure 1:
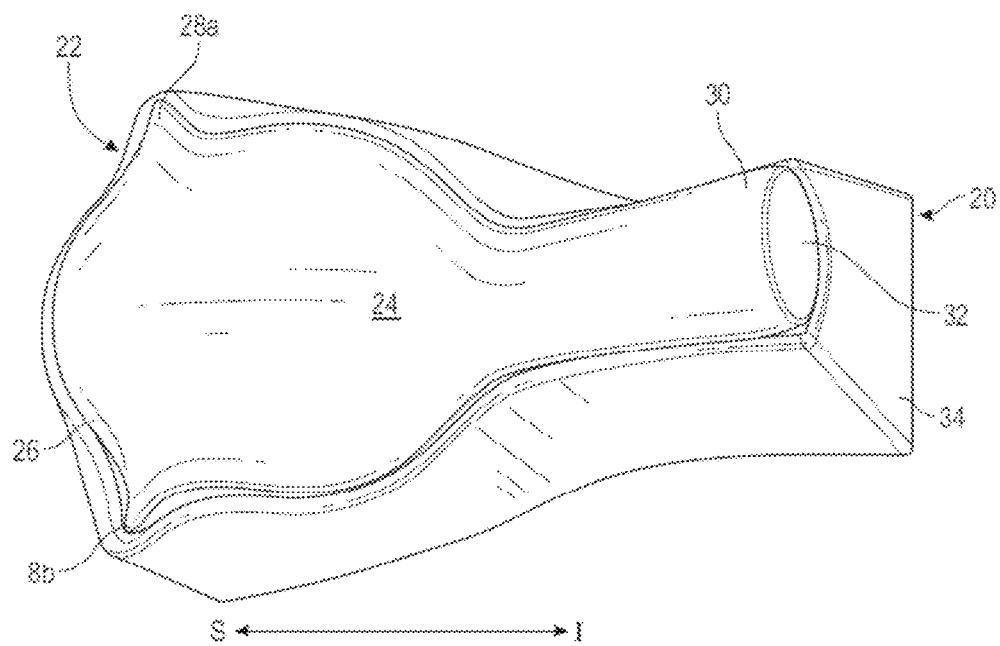
FIG. 1 is a photograph showing an external top perspective view of a simulated human uterus and vagina held on a top surface of a base that has a recess complementary in shape to a posterior portion of the uterus and vagina.

The following explanations of terms and methods are provided to better describe the present disclosure and to guide those of ordinary skill in the art in the practice of the present disclosure. As used herein, "comprises" means "includes." Thus, "comprising A or B," means "including A, B, or A and B," without excluding additional elements.

Unless explained otherwise, all technical and scientific terms used herein have the same meaning as commonly understood to one of ordinary skill in the art to which this disclosure belongs. Although methods and materials similar or equivalent to those described herein can be used in the practice or testing of disclosed invention, suitable methods and materials are described below. It is further to 5 be understood that any quantitative values are approximate whether the word "about" or "approximately" or the like are stated or not.

Clinician: Medical personnel involved in the clinical treatment of patients.

Fabric mesh or netting: A textile material in which the warp and weft yarns are looped or knotted at the intersections, resulting in a fabric with relatively large open spaces between the yarns, which spaces may be rectangular in shape. The fabric can be made of a variety of materials, such as nylon, polyester, tulle, matte tulle, shiny tulle. The preferred fabric disclosed herein is a tulle mesh fabric made of 100% nylon. The fabric mesh or netting is capable of bonding to the silicone rubber material of which the simulated uterus is made. A particularly suitable maximum dimension for the open spaces in the net is between 1.5-4.0 mm to help assure complete encapsulation of the fabric by the silicone rubber material. Complete encapsulation of the mesh (particularly a 4-way stretch mesh) helps avoid delamination of the mesh from the silicone material, and such encapsulation further minimizes a coarse surface texture or ragged incision margins that can be produced with larger openings (such as rectangular openings) in the net.

Fallopian tubes: The fallopian tube is an anatomic tubular structure that extends from the ovary to the uterus, and which opens into the uterus at the junction of the fundus and body. The isthmus of the fallopian tube is a funnel-shaped structure formed where the fallopian tube externally joins the uterus.

Medical personnel: Health care professionals, such as physicians, midwives, nurses, and students. Physicians include many types of practitioners, such as surgeons, surgical subspecialists (such as obstetricians and gynecologists), family practice physicians, and physicians-in-training (including students and residents).

One-piece: A unitary structure, for example a structure that is molded as a one-piece item. In the context of the present disclosure, the simulated uterus may be a one-piece component that is molded from a single mold of the uterus and vagina. However, the simulated uterus and base are not a one-piece unit because they are separable by removing the one-piece simulated uterus and vagina from the base.

Shore durometer: A durometer is a measure of hardness of a material, which is a material's resistance to permanent indentation. Durometers may be calibrated to the Shore A, Shore B, Shore D, Shore DO, Shore DOO, Shore DOO, Shore M Scales as well as other special Durometer scales. Durometer values in this specification are expressed on the Shore A or OO scale.

Tulle: a type of fine netting that has applications in lingerie and bridal wear as well as in technical areas wherein durability and flexibility of the netting are important. Tulle has been used in military applications as radar reflective netting and parachute netting. It has also been used as a light diffusion fabric. Tulle can have either a two-way stretch or a four-way stretch, and either type can be used in the disclosed simulator.

Uterus: A female reproductive organ that can be anatomically subdivided into a body and fundus. The uterus generally joins the cervix at the internal os, and the uterus opens into the vagina. A "gravid" uterus is a uterus that contains a developing fetus; hence the gravid uterus is enlarged as compared to the uterus of a non-pregnant female. A "post-partum" uterus refers to an enlarged uterus following delivery, for example a uterus within 5 days of delivery. The uterus begins to contract soon after birth. Hence a gravid uterus at term (nine months of gestation) has a greater volume than a post-partum uterus, which has a greater volume than a non-parous uterus.

As pregnancy advances the uterine body and fundus assume a more globular form and are almost spherical by the third month. Subsequently the organ increases more in length than width and assumes an ovoid shape.

Introduction

The non-pregnant human uterus is a hollow somewhat pear-shaped muscular organ that is partially covered by peritoneum and is located in the pelvis of a female. For purposes of description it is divided into the fundus, body and cervix. The fundus is the part of the uterus that lies above the entrance of the fallopian (uterine) tubes and the body is the part that lies below the fundus. The body of the uterus narrows to a cervical opening (internal os) and cervix that defines the fusiform cervical canal. Although the cavity of the non-pregnant uterine body is triangular in coronal cross-section, during pregnancy the muscular wall of the gravid uterus undergoes remarkable growth due to hypertrophy of muscle fibers and the cross sectional shape of the uterine body become more ovoid than triangular. The gravid uterus weight increases from about 70 g in the non-pregnant states to about 1100 g at term at which time it also has a volume of about 5 liters. During pregnancy the fundus also becomes more dome-shaped, but it begins to contract at the time of delivery to move the neonate out of the uterus and assist in delivery. Involution of the uterus continues following expulsion of the placenta to return the uterus toward its pre-pregnancy shape and size, which also helps compress blood vessels to minimize bleeding.

Uterine measurements vary between individuals (depending on factors including age, history of previous or current pregnancy, time elapsed since delivery in postpartum patients, and uterine pathology such as fibroids). However, examples of approximate average dimensions of the uterus are:

Non pregnant Uterus: 8 cm×5 cm×2.5 cm.

Pregnancy—the uterine height in the second half of pregnancy is approximately the gestational age in weeks+/−3 cm.

Postpartum: Approximately 16-20 cm long×9 cm wide (in sagittal plane).

The decrease in maternal and neonatal mortality and morbidity brought about by improved pre-natal and obstetric care represents one of the great medical advances of the last century. One reason for this advance is the development of medical and surgical interventions to treat complications that arise in the perinatal period prior to, during or following birth. For example, it is routine for a cesarean delivery to be performed to preserve the health of a mother and/or baby. Postpartum hemorrhage is in the top five most common causes of maternal death in developed countries and is the number one cause of maternal death in Africa and Asia (according to the World Health Organization). Many deaths due to postpartum hemorrhage are potentially preventable and simulation drills for the management of postpartum hemorrhage have been developed so that health care workers can "rehearse" and perfect the management of postpartum hemorrhage in a training situation.

In most case simple maneuvers such as uterine massage, repair of perineal tears, and uterotonic drugs are effective in the managements of postpartum hemorrhage. Procedures, such as the introduction of a balloon tamponade into the uterus (vaginally or through a uterine incision), or placement of arterial ligation (such as O'Leary or uterovarian ligation) sutures or uterine hemostatic suturing or compression sutures in the uterus, can be used to control post-partum hemorrhage when other interventions fail. These procedures are needed in only a minority of cases but are important skills to have immediately available as they have the potential to avert the need for hysterectomy or may even be life-saving. The B-Lynch suture is an example of a procedure that is used to control post-partum hemorrhage. Additional information about the diagnosis and treatment of post-partum hemorrhage with tamponade or a B-Lynch (Brace) suture are provided in ACOG Practice Bulletin No. 76 (October 2006) which is incorporated by reference.

Figure 2:
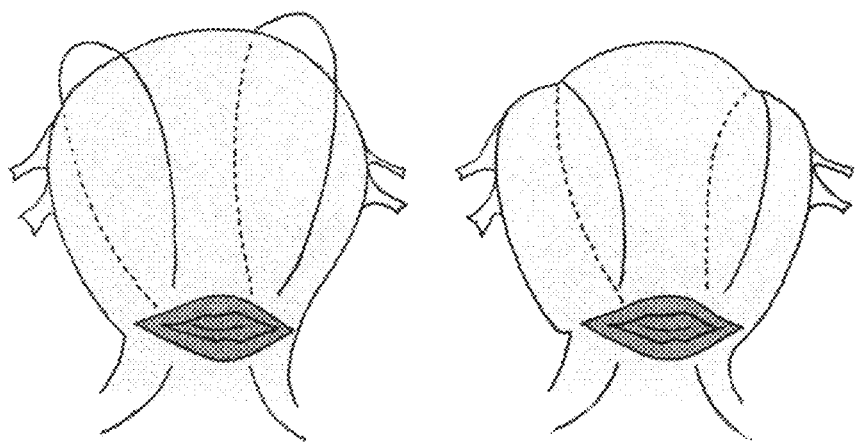
FIG. 2 schematically illustrates a B-Lynch procedure that can be practiced using the disclosed simulator.

The B-Lynch technique is schematically illustrated in FIG. 2 (from Wikipedia Open Commons). The technique was reported by Christopher B-Lynch and co-authors in the Br J Obstet Gynaecol in 1997. An absorbable compression suture is inserted into the uterus after making a lower uterine segment incision or after re-opening a previous Caesarian section incision. The suture is placed through the lower uterine incision margin 3 cm from the left inferior edge and 3 cm from the lateral border. The suture is then threaded through the uterine cavity to emerge at the upper incision margin 3 cm above and approximately 4 cm from the left lateral border. The suture is advanced anteriorly and vertically to enter the posterior wall and the uterine cavity at the same level as the upper anterior entry point. The suture is then pulled under moderate tension assisted by bi-manual compression exerted by an assistant. The suture is passed posteriorly until the suture lies horizontally in the uterine cavity. The suture is then advanced posteriorly and vertically over the fundus to lie vertically on the uterus and compress the fundus. A pair of generally parallel compression sutures is usually placed over the uterus to compress it and control bleeding, as shown in FIG. 2. The compression sutures are then tightened to compress the uterus as shown in FIG. 2 on the right. More information about the procedure can be found in A Textbook of Postpartum Hemorrhage edited by Christopher B-Lynch et al. (October 2006). Others have subsequently described variations in the procedure including a modification without the need for a uterine incision. The B-Lynch suture has been reported to be associated with a high success rate in the management of postpartum uterine hemorrhage (El-Hamamy E, B-Lynch C. A Worldwide review of the uses of the uterine compression suture techniques as alternative to hysterectomy in the management of severe post-partum haemorrhage. J Obstet Gynaecol 2005; 25:143-9) and the California Maternal Quality Care Collaborative Toolkit to Transform Maternity Care states that "Uterine hemostatic suturing should be available in all obstetrical units" and that "all delivery providers at the institution should be made aware of the steps included in the technique". (Lyndon A, Lagrew D, Shields L, Melsop K, Bingham B, Main E (Eds). Improving Health Care Response to Obstetric Hemorrhage. (California Maternal Quality Care Collaborative Toolkit to Transform Maternity Care) Developed under contract #08-85012 with the California Department of Public Health; Maternal, Child and Adolescent Health Division; Published by the California Maternal Quality Care Collaborative, July 2010). However, the American Congress of Obstetricians and Gynecologists states in its Practice Bulletin on Postpartum hemorrhage that "many clinicians have limited experience with this procedure". (Postpartum Hemorrhage ACOG Practice Bulletin No. 76. American College of Obstetricians and Gynecologists. Obstet Gynecol 2006; 108:1039-47. Reaffirmed 2015). As such, a device to enable realistic training in the insertion of uterine compression sutures is an important component of simulation training for both trainees and trained medical practitioners.

Another procedure used for the management of postpartum hemorrhage is the insertion of a balloon tamponade into the uterus (either trans-vaginally after vaginal delivery or through the uterine incision at cesarean delivery). Once placed in the uterus, the balloon is inflated with sterile fluid thus creating pressure within the uterus. It is used as a temporary (up to 24 hours) means of reducing or stopping uterine bleeding in the postpartum period. It is on occasion used in combination with a B-Lynch suture (see above). The American Congress of Obstetricians and Gynecologists Safe Motherhood Initiative, Maternal Safety Bundle for Obstetric Hemorrhage, January 2016 (ACOG.org), states that the intrauterine balloon should be "placed under ultrasound guidance".

Other techniques that can be used in the management of postpartum hemorrhage include insertion of arterial ligation sutures (such as the O'Leary sutures) to reduce blood flow to the uterus, uterine exploration (either with instruments or with direct inspection at an open surgical procedure), insertion of placental bed sutures, repair of inner myometrial tears, repair of uterine ruptures, uterine massage, bimanual uterine compression and curettage to remove clots, retained membranes and placenta.

Compression sutures and other procedures used in the management of postpartum hemorrhage may avoid blood transfusion, avert the need for hysterectomy thereby preserving potential future fertility, and may be life-saving for the mother. These procedures are performed under stressful time-sensitive conditions that require a high degree of skill and afford less than desirable circumstances for teaching the procedure to a medical practitioner. The present invention therefore concerns a simulation device that is particularly suited to practicing these and other obstetric procedures repeatedly and under less stressful and risk-prone circumstances than occur during a life-threatening emergency in a clinic or operating room. The simulation device advantageously mimics the texture and even temperature of the uterus and optionally some of the soft tissues that surround it. The simulated uterus contains a mesh material that renders it particularly useful for incision and subsequent suturing because the mesh retains suture material without allowing the surrounding simulated skin to be easily torn. The simulated mesh-reinforced uterus is also sufficiently durable that multiple incisions and sutures can be made in it to make the simulator more cost-effective. The disclosed simulator is also light-weight during shipment or storage because it is substantially hollow. However a portion of it (such as a rigid base) can be filled with a liquid to increase the weight of the simulator for enhanced stability during use. The temperature of the liquid can be controlled by adding water of a desired temperature or by regulating the temperature of the water with a heater and thermostat.

Postpartum tubal ligation is one of the most common methods of birth control in the USA, is performed in the postpartum period in up to 10% of deliveries, and the American Congress of Obstetrics and Gynecology has highlighted the importance of the availability of postpartum sterilization. (Access to postpartum sterilization. Committee Opinion No. 530. American College of Obstetricians and Gynecologists. Obstet Gynecol 2012; 120:212-15)

Approximately one half of pregnancies in the USA are reported to be unintended. Long acting reversible contraception such intrauterine contraceptive devices (IUCD) are highly effective methods of birth control and do not rely on a high degree of patient compliance (such as taking a daily pill) once the method has been initiated. Insertion of intrauterine contraceptive devices in the immediate postpartum period has advantages over delayed postpartum insertion and can be performed after vaginal or cesarean delivery. (Long-acting reversible contraception: implants and intrauterine devices. Practice Bulletin No. 121. American College of Obstetricians and Gynecologists. Obstet Gynecol 2011; 118:184-96). There are contraindications to immediate postpartum IUCD placement (including chorioamnionitis) and it is associated with higher rates of expulsion compared to insertion remote from pregnancy. However, immediate versus delayed postpartum IUCD insertion has been reported to be associated with a higher rate of continued IUCD use at 6 months. (Erika E. Levi, MD, MPH, Gretchen S. Stuart, MD, MPHTM, Matthew L. Zerden, MD, MPH, Joanne M. Garrett, PhD, and Amy G. Bryant, MD, MSCR Intrauterine Device Placement During Cesarean Delivery and Continued Use 6 Months Postpartum☐A Randomized Controlled Trial Obstet Gynecol 2015; 126:5-11). The technique for immediate postpartum placement (particularly at the time of cesarean delivery) is different from IUCD placement in the non-pregnant patient and requires specific training.

Simulated Uterus

Figure 3:
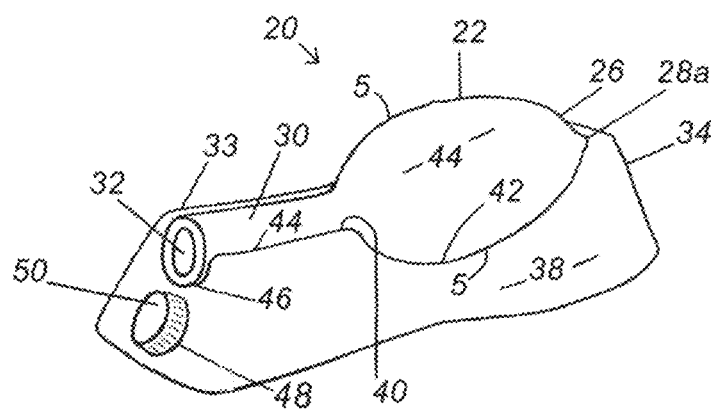
FIG. 3 is a perspective drawing of the simulated uterus and vagina on the base.

The simulator is further illustrated in the accompanying figures. FIG. 1 shows an assembled simulator 20 that contains a simulated post-partum uterus 22 and base 34 while FIG. 3 shows the isolated base 34 (of a different color) from which the simulated uterus has been removed. Uterus 22 is made of a silicone rubber material that has a texture similar to that of natural uterus tissue and is suitable for being incised and sutured, and is sufficiently pliant to be bent upwardly away from a location where it is secured to the base and/or compressed to simulate uterine compression techniques. The illustrated post-partum uterus 22 is generally "bulb-shaped" or ovoid having a flattened balloon-shaped body 24, a dome-shaped fundus 26, and two funnel-shaped isthmuses 28a, 28b. Extending inferiorly from body 24 is a simulated generally cylindrical or frustoconical simulated vagina 30 that terminates in an external vaginal opening 32 defined by a peripheral lip 33. The diameter of vagina 30 may decrease slightly from its attachment to body 24 to its free open end, or have a substantially constant diameter. Vagina 30 is molded integrally with uterus 22 to form a one-piece model that can be placed in the base 34 for training medical personnel to perform medical and surgical procedures.

For purposes of further describing the uterine simulator, the anterior portion of uterus 22 is seen in FIG. 1, while the posterior portion is seated against the underlying base. The fundus 26 will be considered the superior portion of the uterus, and vagina 30 extends inferiorly from an inferior aspect of uterus 22. The illustrated uterus 22 and vagina 30 are elongated in the direction of a longitudinal axis (not shown) that extends from fundus 26 through body 24 and vagina 30. The simulated uterus is therefore elongated in a superior/inferior S-I direction, but slightly flattened in the anterior/posterior dimension (see FIG. 4) such that it is generally ovoid in horizontal and vertical cross-section but is also generally symmetric with respect to a plane of symmetry P (FIG. 4) that bisects the uterus and vagina into anterior and posterior halves and contains isthmuses 28a, 28b.

The silicone rubber material that forms the simulated uterus and vagina is described in greater detail below. However, the general dimensions of the illustrated uterus 22 and vagina 30 are as follows: twenty cm wide at the widest point of the uterine body, and twenty-one cm long from the top of the fundus to the internal os where the uterine body opens into the vagina. The vagina is about ten cm long from the internal os to the terminal open end of the vagina that is defined by peripheral lip 33, hence the total combined length of the uterus and vagina is thirty-one cm. The thickness of the walls of the uterus and vagina are 3-5 mm, and in particular embodiments 5 mm.

To distinguish the post-partum uterus from a non-pregnant uterus, a particular embodiment of the body 24 of the post-partum uterus is ovoid in horizontal cross-section (FIG. 4) and/or has a volume of at least 0.25 liter, for example at least 0.5 L or 1 L. In another embodiment the volume would be less than 2 liters. In some examples of the post-partum uterus, the volume the body 24 of uterus 22 is 0.25-1.9 L, for example 0.25-0.75 L or 0.5-1.9 L or 0.5-1 L. The post-partum uterus does not have a simulated fetus in it. The external shape of the post-partum uterus is globular with convex outer walls, unlike the generally slightly concave walls of the non-pregnant uterus. Other embodiments of the uterus, such as a C-section simulator in a gravid uterus, can have different volumes and/or contain a simulated fetus. For example, the simulated pregnant uterus can have a volume of more than 2 L, for example 2-5 L or 3-5 L.

Simulated uterus 22 and vagina 30 are selectively seated in rigid hollow base 34 that has thin walls (approximately 3-5 mm thick). Base 34 has a flat bottom surface (not shown) and a recessed generally concave top support surface 36 that is recessed in a shape that is substantially complementary to and/or conforms to the posterior portion (such as the posterior half) of uterus 22 and vagina 30. As shown in FIG. 3, base 34 has a continuous sidewall 38 that extends around the periphery of the base and around recessed support surface 36 which has a generally concave surface. In the particularly disclosed embodiment shown in FIGS. 1 and 3, the base is thirty-two cm long (in the direction of the long axis of the uterus and vagina), a maximum of twenty-six cm wide (parallel to base 34), and nine cm high (perpendicular to base 34 through isthmuses 28a, 28b). The width dimensions of the recessed support surface (parallel to base 34) are similar to but slightly greater (for example 1 mm or less) than the width dimensions of the simulated uterus and vagina such that the inner walls of the recessed support surface 36 generally conform to and support a posterior of uterus 22 and vagina 30. However, the maximum depth of the cavity that forms recess 36 (a dimension perpendicular to the flat bottom surface of the base) is less than the maximum height of uterus 22 and vagina 30 so that a portion of the height of uterus 22 and vagina 30 extends above the upper edge of sidewall 38 of base 34. In the illustrated embodiment, the depth of the recess varies so that its surface has a depth that complements the posterior surface of the uterus and vagina, and the depth is generally about half (40-60%, for example 50%) the height of the uterus and vagina at any point on the recessed support surface 36.

In other embodiments the depth of the recess is not about half the height of the portion of the simulated uterus/vagina it supports; it may be more or less than that depth. Similarly, the recess need not be a constant fraction of the height of the supported portion, but rather the depth of the recess can vary for example from 40% the height of the supported vagina to 60% of the depth of the supported uterus, or vice versa.

An alternative embodiment of the base is shown in FIG. 3 which illustrates that base 34 having an optional generally location 40 for attaching a strap or other fixation device across vagina 30 near body 24 of uterus 22. This perspective section also illustrates that the top edge of sidewall 38 can be contoured instead of level. For example the top edge includes a concave edge portion 42 that holds the sides of uterine body 24, joined to location 40 where the edge becomes a generally flat or horizontal edge 44 of base 34 that cradles vagina 30. The edge forms a substantially semi-circular support lip 46 that supports the lip 33 of vagina 30. Although not shown in the drawing, lip 33 can be hinged to support lip 46 to permit controlled pivoting of uterus 22 around a substantially horizontal axis when simulating a surgical procedure in which the uterus is mobilized from its resting position shown in FIG. 3. Alternatively the strap is secured to opposing sidewalls 38 at location 40 of base 34 and secured over vagina 30 to allow uterus 22 to be raised from its resting position without dislodging the entire simulated uterus/vagina from base 34. The simulated uterus is made of a resilient material such that uterus 22 bends as the body of the uterus is lifted from base 34. The resilient material is also capable of being compressed, for example by at least 25% or 50%, such as 25-50%, of its volume. Hence simulated uterine body 24 is capable of being compressed by at least 25% from its original volume to simulate uterine compression procedures.

Another aspect of base 34 shown in FIG. 3 is the presence of a port 48, which is an opening in the wall of base 34 below support lip 46. The opening (not shown) has an externally threaded collar that mates with an internally threaded cap 50 which can be rotated to remove cap 50 and expose the opening. Liquid can be introduced through the opening to fill base 34 with a liquid such as water that increases the weight of base 34 to stabilize the base during use. To substantially fill the base with liquid, the base can be oriented such that the opening faces up while liquid is introduced into the base to a desired level. Cap 50 is then threaded on to the collar of port 48 to substantially seal the opening, and the base is reoriented to the level position shown in FIGS. 1 and 3. In some embodiments base 34 is filled with a heated liquid, such as hot water, to heat uterus 22 and vagina 30 to simulate physiological conditions and the tactile feel of skin. For example, the heated liquid can be water that is pre-heated to greater than room temperature (about 25° C.), for example to a temperature (35-40° C.) that is near body temperature, or to an even higher temperature. Alternatively, the temperature of the liquid can be controlled by a heater and thermostat (not shown). Heating the base with the liquid conductively heats the material of the simulated uterus and vagina to simulate conditions inside the human body.

Figure 4:
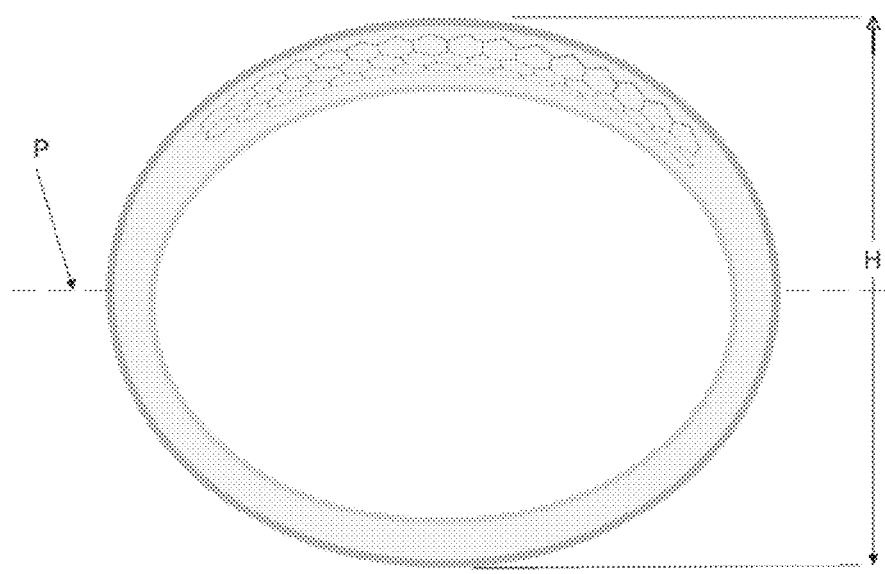
FIG. 4 is a schematic cross-sectional view through the body of the simulated uterus, showing mesh embedded in an anterior wall of the body of the simulated uterus. This is a "horizontal" cross-section of the uterus since the fundus is referred to as the superior portion of the uterus for purposes of reference. A "vertical" cross-section would be perpendicular to the horizontal cross-section.

FIG. 4 is a cross-sectional view of the body 24 of the uterus 22. This view illustrates the generally ovoid cross-sectional shape of body 24 which has a lesser anterior/posterior dimension than a transverse dimension (where the transverse dimension is in the direction of a plane of symmetry P that bisects body 24 and vagina 30). The plane of symmetry P illustrates that the anterior wall 52 and posterior wall 54 of simulated uterus 22 are substantial mirror images of one another. Although not shown in the drawing, vagina 30 is similarly symmetric above and below a plane of symmetry that bisects the vagina. The embodiment of FIG. 4 also has a 100% nylon tulle mesh 56 embedded in the anterior wall 52 of body 24, however mesh can alternatively be placed in both the anterior and posterior walls, or extend substantially entirely around the circumference of body 24. The mesh provides structural stability to the body 24 when it is incised, and is particularly useful as a substrate to which sutures can adhere when suturing the wall. The mesh also improves the ability of body 24 to withstand multiple incisions at different locations, or multiple openings and suturing of a single incision. Embodiments of the uterus that have mesh in both the anterior and posterior wall are particularly suited to reuse of the simulator by turning it over so that the anterior wall becomes the anterior wall and vice versa.

Figure 5:
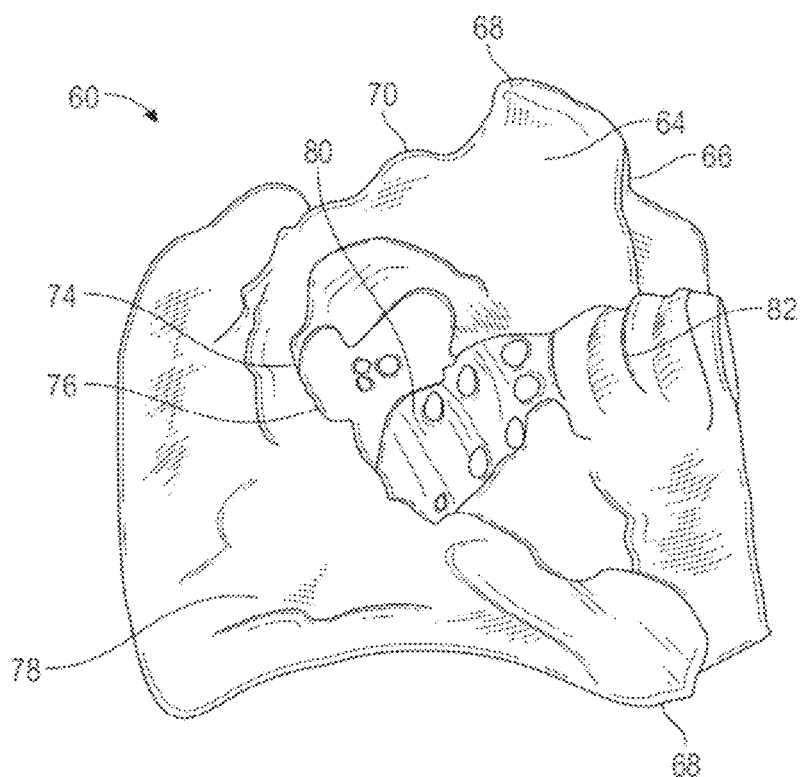
FIG. 5 is a perspective view of another embodiment of the base that simulates the pelvic girdle and other bony anatomy of the abdominopelvic region. Although not shown in the drawing, the illustrated base is hollow so that it can be filled with liquid through a port (not shown).
Figure 6:
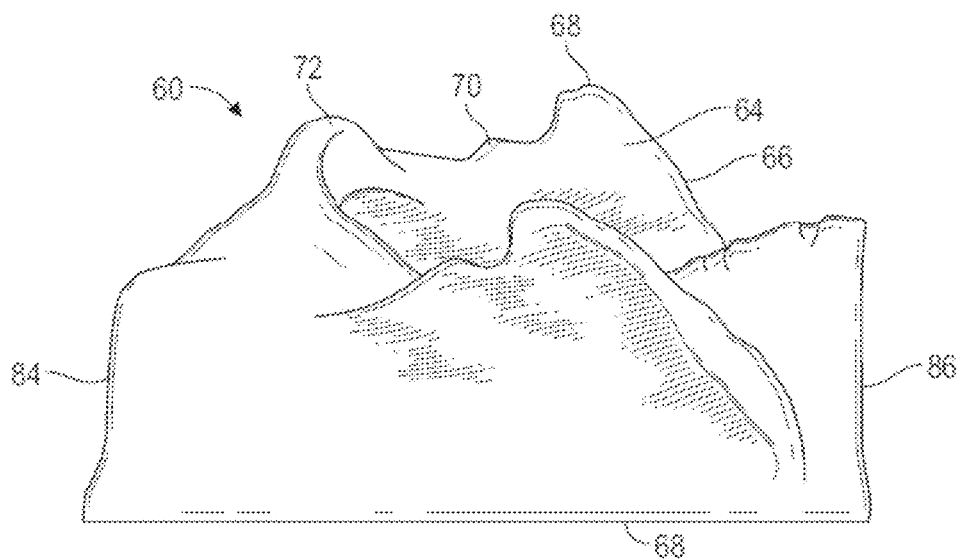
FIG. 6 is a side view of the abdominopelvic base of FIG. 5.

FIGS. 5-6 are drawings that illustrate an abdominopelvic base 60 for use with the simulated uterus 22 and vagina 30 earlier described. Abdominopelvic base 60 replaces base 34 and simulates hard tissue (particularly bony anatomic features) that would be encountered by a clinician when performing a procedure on the uterus. For example, base 60 mimics the three dimensional topography of an anterior portion of the pelvis and proximal femurs but without necessarily replicating the actual bones themselves. As shown in the drawings, base 60 has a flat bottom surface 62 and a sculpted anterior surface with features that mimic the natural anatomic placement and shape of one or more or all or any combination of: ilacus 64, iliac crest 66, anterior superior spine 68, anterior inferior spine 70, iliopubic eminence 72, symphysis pubis 74, pubic tubercle 76, head of femur 78, anterior surface of the coccyx (not shown), anterior surface of sacrum 80, and anterior surface of lumbar vertebrae 82 (such as L4 and L5). Base 60 is illustrated with a substantially flat inferior wall 84 and superior wall 86 that define the anatomically inferior and superior extent of the anatomy simulated by base 60.

Although not shown in FIGS. 5 and 6, simulated uterus 22 and vagina 30 can be cradled in base 60 as it was in base 34. In base 60, the peripheral lip 33 of vagina 30 would rest against the area of the coccyx or sacrum in base 60, with the length of vagina 30 resting on the sloped bottom portion of base 60 that is formed by the portion of base 60 that simulates the surface of sacrum 80. Body 24 of uterus 22 would rest on base 60 between the iliac bones with peripheral vaginal lip 33 circumscribing a simulated vaginal opening in a simulated perineum (not shown) of the base. Although not shown in FIGS. 5 and 6, there is an opening through the pelvis that is substantially circular in cross-section and has a diameter and circumference that is substantially the same as the diameter and circumference of the distal end of simulated vagina 30. The free distal end of vagina 30 is introduced into and through the opening from the abdomen and pelvis until lips 33 of vagina 30 reach the simulated vaginal opening externally. With the vagina thus located, the uterus fits snugly inside the pelvic cavity.

Figure 7:
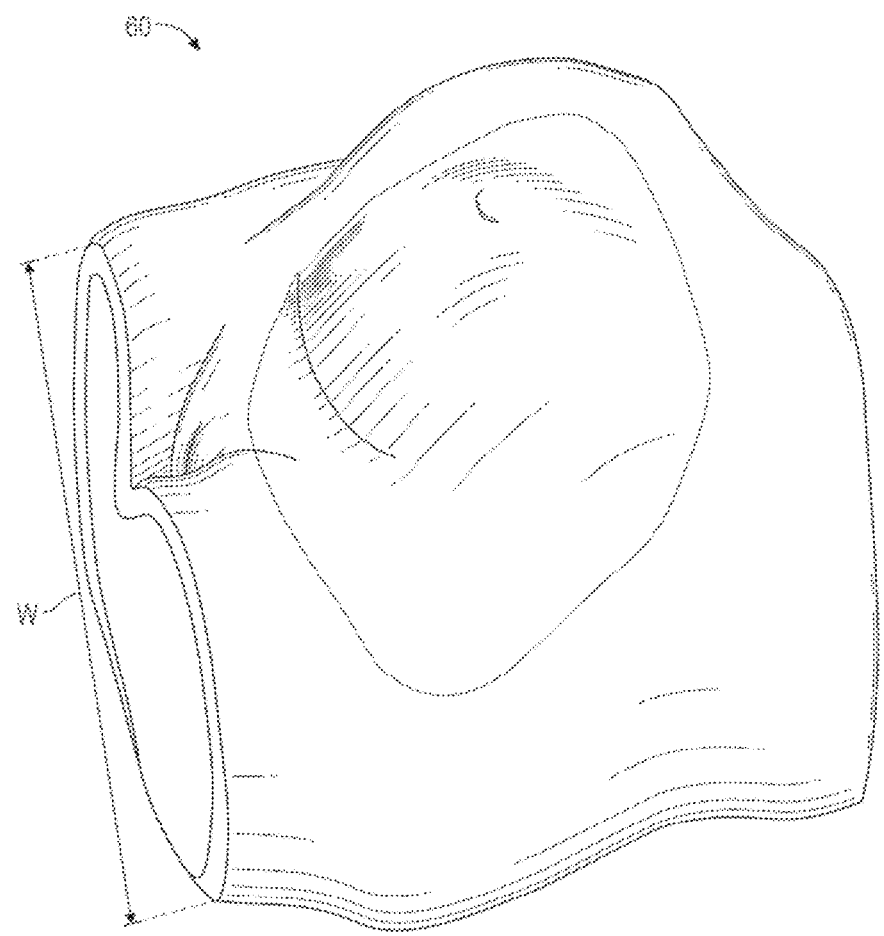
FIG. 7 is a top perspective view of the base of FIGS. 5 and 6 encased within an elastomeric material that simulates post-partum abdominopelvic soft tissue.
Figure 8:
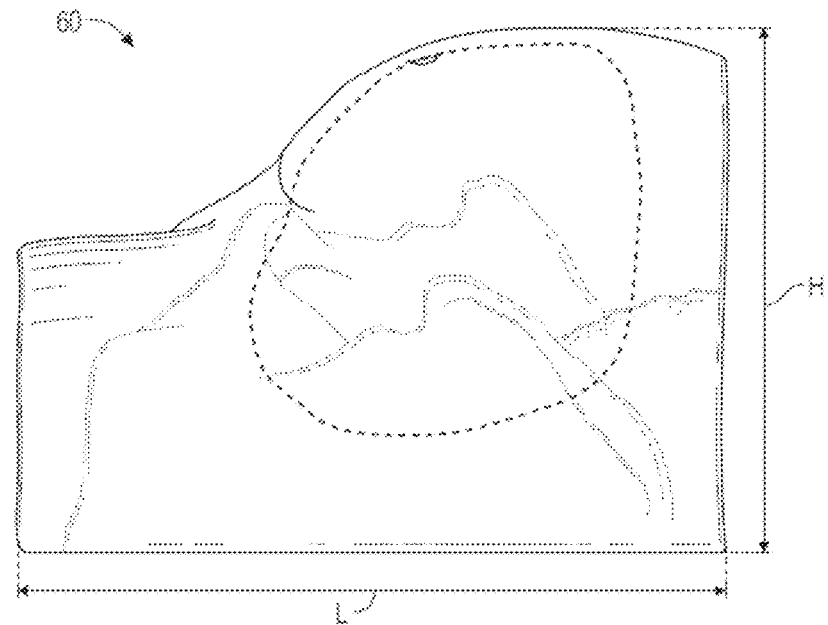
FIG. 8 is a side view of the base shown in FIG. 7 but with the soft tissue shown as transparent, and the dotted line illustrating a cavity within which the uterine simulator can be placed.
Figure 9:
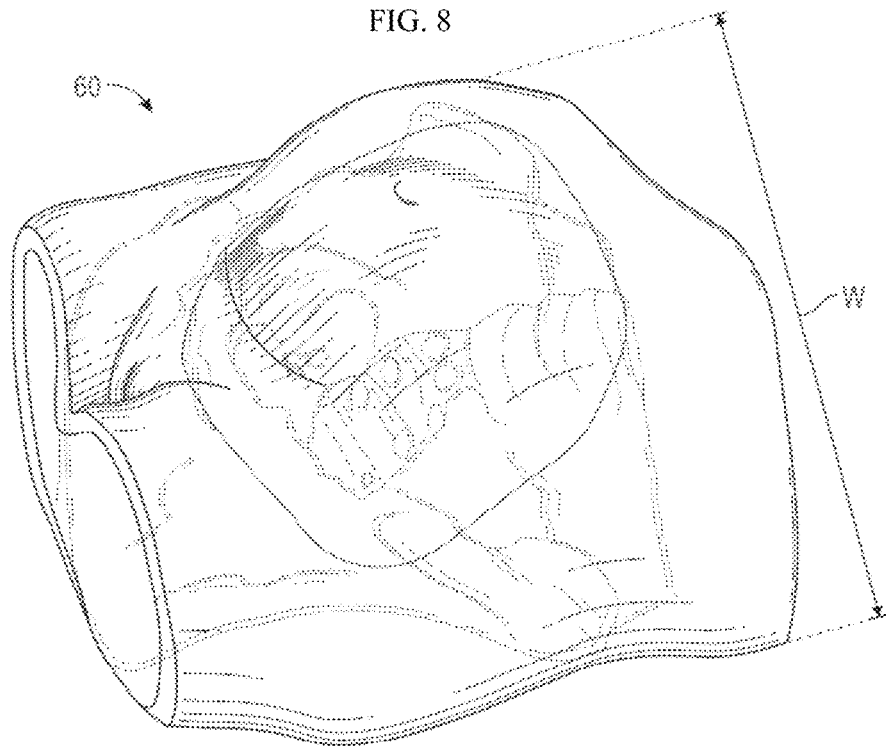
FIG. 9 is a view similar to FIG. 7, but illustrating the simulated hard tissue base encased within the overlying simulated soft tissue, and the anatomic 5 relationship of the hard tissue to the overlying soft tissue.

FIGS. 7-9 illustrate another embodiment of abdominopelvic base 60 that is encased in an elastomeric material that simulates any one or both of human muscle and skin. The illustrated model simulates the protuberant abdomen of a post-partum female (such as a female that has given birth in the preceding few hours or day), although in other non-illustrated embodiments the abdomen could model that of a pregnant or non-pregnant female. FIGS. 8 and 9 illustrate in phantom the encased hard base 60 that mimics the bony surface features of the abdominopelvic region.

In the illustrated example, the simulator of FIGS. 7-9 has the following dimensions as labeled in the drawings (wherein the dimensions are the largest dimension in each direction): Width (W) of 43 cm, Length (L) of 42 cm, and Height (H) of 30 cm. The simulator can be made in other dimensions or ranges of dimensions, such as a Width (W) of at least 40 cm, for example 40-45 cm, Length (L) of at least 39 cm, for example 39-44 cm, and Height (H) of at least 28 cm, for example 28-32 cm. The base 60 has a substantially planar surface through the upper thighs and a simulated perineum and vaginal opening are contained between the thighs. Base 60 similarly has a planar surface through the upper abdomen at a junction of the abdomen and thorax.

In use, the abdominopelvic simulator of FIGS. 7-9 is used by locating anatomic features on the surface of the abdomen and making an incision to expose or externalize uterus 22. The now exposed uterus 22 can be incised in situ, for example to practice Caesarian section (low transverse or classical), uterine curettage, insertion of an intrauterine tamponade balloon, insertion of uterine artery ligation sutures, or insertion of compression sutures such as the B-Lynch procedure. Any incisions are preferably made through a portion of uterus 22 that contains mesh 56 embedded within the wall of the uterus. After the procedure is performed, any incision in the simulated uterus 22 and overlying soft tissue can be sutured to close the simulated incisions.

Other potential uses of the simulator include use of the stand-alone embodiment of FIGS. 1-4 to:

1. Train for cesarean delivery (both classical, transverse and T-shaped incisions), including opening of the uterus, and closure of the uterine incision using a single layer or double layer closure incorporating imbricating layers. Train for repair of uterine rupture, repair of inner myometrial tears, and insertion of placental bed sutures.

2. Train for insertion of uterine compression sutures (including but not limited to the B-Lynch suture) for the management of postpartum hemorrhage.

3. Train for uterine artery ligation (including but not limited to O'Leary sutures) for the management of postpartum hemorrhage.

4. Train for insertion of an intrauterine balloon for uterine tamponade in the management of postpartum hemorrhage, either by inserting the uterine balloon catheter through the simulated vaginal opening and vagina into the uterus or by insertion through a hysterectomy or uterine incision.

5. Train for uterine exploration and curettage as part of postpartum management.

6. Train for open surgical techniques for tubal ligation for female sterilization.

7. Train for uterine packing in the management of postpartum hemorrhage.

8. Train for insertion of a cervical cerclage.

9. Train for insertion of an intrauterine contraceptive device during the postpartum period through either a hysterectomy or uterine incision or via a transvaginal approach.

10. Train for ultrasound guidance for postpartum procedures such as post delivery intrauterine contraceptive device placement, uterine curettage, and placement and inflation of an intrauterine balloon.

Potential uses of the abdominopelvic simulator of FIGS. 5-9 include:

1. Train for cesarean delivery technique (classical transverse and T-shaped incisions) from opening of the skin. A gravid uterus (as opposed to a postpartum uterus) could be made to accommodate a simulated fetus within it. Train for repair of uterine rupture, repair of inner myometrial tears, and insertion of placental bed sutures.

2. Train for insertion of uterine compression sutures (including but not limited to the B-Lynch suture)

3. Train for uterine artery ligation for the management of postpartum hemorrhage.

4. Train for insertion of an intrauterine balloon for uterine tamponade in the management of postpartum hemorrhage, either by inserting the uterine balloon catheter through the simulated vagina into the uterus or by insertion through a hysterectomy or uterine incision.

5. Train for uterine exploration and curettage as part of postpartum management.

6. Train for tubal ligation at the time of cesarean delivery.

7. Train for post partum tubal ligation through a sub-umbilical incision.

8. Train for uterine packing in the management of postpartum hemorrhage.

9. Train for insertion of an intrauterine contraceptive device during the postpartum period through either a hysterectomy or uterine incision or via a transvaginal approach.

10. Training for insertion of a cervical cerclage.

11. Training for ultrasound guidance for procedures such as post delivery intrauterine contraceptive device placement, uterine curettage, and placement and inflation of an intrauterine balloon.

The following Examples illustrate additional features of the simulator.

Example 1

Silicone Rubber Materials 5 for Simulated Uterus

In one embodiment, the artificial uterus is formed of a platinum cured room temperature vulcanization silicone rubber ("PCRTVS") or a combination of several PCRTVS. In a particular example, the uterus is made of Dragon Skin® FX Pro, a super soft, stable, high-performance platinum silicone rubber. This soft and stretchy material has a Shore hardness of 2 A. A Shore A hardness of less than 5 is preferred. In some embodiments the Shore A hardness is 2 or less, for example a hardness on the Shore 00 hardness scale, which is softer than the Shore A scale. A range of products can be used to achieve this Shore hardness levels that are lower than the hardness of Dragon FX Pro. For example an Ecoflex® platinum catalyzed silicone rubber can be used, such as any of the following materials:

Ecoflex® 5—Shore 5 A hardness (available only in 400 ML cartridges)

Ecoflex® 00-50—Shore 00-50 hardness (below the Shore A scale)

Ecoflex® 00-30—Shore 00-30 hardness

Ecoflex® 00-20—Shore 00-20 hardness

Ecoflex® 00-10—Shore 00-10 hardness (extremely soft)

The Ecoflex® material is capable of being elongated, for example up to 100% or more (and in some instances up to 900%) depending on the thickness of the silicone material. However, other silicones could be used that are not platinum catalyzed. Such materials include Condensation Cure silicones, although the platinum catalyzed silicones are preferred because of their softness.

Color effects are achieved by adding Silc-Pig® silicone pigments to the silicone rubber. The silicone rubber starting material is prepared and deposited into the mold to manufacture the simulated uterus. A slurry or mix can be used that contains ground granular cured PCRTVS mixed into a liquid PCRTVS. Other materials that may be mixed into the PCRTVS for color, texture and/or reinforcement include tulle netting. Tulle netting is a lightweight, fine netting that can be made of various fibers such as silk, nylon or rayon.

In other embodiments the simulated uterus is made of a material, such as a silicone rubber, that is compressible. The compressible material allows simulated uterus 22 to be compressed when simulating uterine compression procedures. In some examples, the volume of uterus 22 can be compressed by at least 10%, 20% or 25% of its original volume.

Example 2

Stand Alone Uterus
Materials

The matrix mold for the uterus is made of silicone supported in a dental plaster shell. The plaster was used in lieu of a more durable material like resin and fiberglass or a rigid urethane, but those materials could be substituted for the plaster.

The uterus was made of Dragon Skin® FX Pro, a Super Soft Platinum Catalyzed Silicone Rubber tinted with Silc Pig® silicone color pigment. Both were developed for use in the make-up FX industry and are available from Smooth-On Inc. 2000 Saint John Street Easton, Pa. 18042.

Method

The uterus was modeled in clay and a simple two-part matrix mold was made. Tinted Dragon FX Pro was painted into both halves of the mold and then a layer of nylon tulle fabric was laid in over the area that would be the incised part of the uterus. This process was repeated twice therefore making three layers of tulle laminated between three layers of Dragon FX Pro. The two halves were then joined together and 300 mls of Dragon FX Pro were poured into the mold, rotating the mold to evenly coat the inside surface. The material thickens and sets in about ten minutes and then another 300 mls were then poured in and rotated again. The mold halves were then separated and the finished uterus removed.

Example 3

Stand-Alone Uterus in Support Base

The base support for the uterus is a hollow vessel with a screw top port to fill the base with water, which will increase its weight and stabilise the uterus onto whatever work surface supports the base. The substantially hollow base that can be filled with a liquid allows the product to be as lightweight as possible for transportation. Water is a preferred liquid to use because it is readily available and inexpensive. Also, introducing hot water into the hollow interior of either the stand-alone base or the abdominopelvic support for the uterus in the abdomen would provide heat throughout the simulator to replicate the body temperature to simulate tactile feedback similar to that encountered when manipulating organs and tissue within the human body.

Materials

The base is made of a readily available dental laboratory product for repairing dentures. Standard denture EXCEL RAPID REPAIR Powder (cadmium free) in suspension of RAPID REPAIR Universal Liquid (Self cure Methyl Methacrylic).

Powder complies with BS EN ISO 1567:1995 Type II Class I

Liquid complies with BS EN ISO 1567:1995 Type II Class I

This product was purchased from Wright Cottrell, Dundee, a standard dental material and equipment supplier in the UK. Similar products are readily available worldwide. The black pigment used is a standard artist oil paint.

Method

The shape of the support was modeled in clay and molded using a silicone matrix mold. It was first cast in dental plaster and then the shape was refined. This was then molded, again using a simple two-part matrix mold using silicone supported in fiberglass and resin. Then 300 mls of Excel Rapid Repair was poured into the closed mold and the mold rotated to coat the inner surface. The liquid rapidly thickens and sets hard in about five minutes. The temperature rises rapidly as it hardens. After being left to cool (about 20 minutes), another 300 mls was poured in and the process repeated. The mold is then opened and the vessel removed. The form has a screw-top opening and only needs a compatible screw-cap.

The support can be made of a variety of other materials, such as polypropylene or polycarbonate.

Example 4

Construction of Abdominopelvic Simulator

The anatomically correct simulated lower abdomen of FIGS. 7-9 is a support for the simulator that can be used as a substitute for the stand-alone base version of FIGS. 1 and 3. The abdominopelvic simulator is particularly suited for a student to experience a realistic simulation of performing a B-Lynch Suture. The difference between having the uterus in the abdomen or as a stand-alone is that the outer skin of an abdominal model can be incised and the post-partum uterus "discovered" in situ. The simulator mimics some difficulties a student may encounter in trying to work in an environment with slippery organs with only a small incision as access.

The simulated abdomen has three layers:

The first layer is a rigid base designed as a substantially hollow vessel (shown in FIGS. 5-6), which can be filed with hot water. The weight of the water stabilizes the abdomen on the worktable. The heated water increases the temperature of the whole abdomen up to body temperature much like a hot water bottle. Simulated soft tissue encasing the rigid base helps insulate the interior of the simulator to retain heat within it. The shape of the rigid vessel is the same as the bone structure of the lower abdomen, simulating the pelvic girdle, the lower spine, and the hip joints and heads of the femurs. The rigid vessel cannot be cut into and offers resistance below the two layers above.

The second layer simulates the muscles and soft tissue covering the rigid base and therefore has a lower Shore hardness than the rigid base. The pelvic cavity is defined and the space is compatible to contain the simulated uterus.

The third layer simulates the skin. It is anatomically correct and is capable of being incised and sutured many times. Its texture resembles real skin.

Each layer is completely compatible with the one underlying it and can be replaced without the need to purchase an entire simulator. Using a rigid vessel as the under support for the uterus enables the simulator unit to be as light as possible for transportation yet when filled with hot water the unit is stabilized to simulate the weight of the human body. The rigid base also heats the product to body temperature. Combining the textures from the 'bone' under support with the muscle layer and skin layer simulates the human body.

Materials

The rigid bone-mimetic layer is made from AC 100, commonly called Jesmonite, which is a rigid water based casting resin which is supported with laminated fibreglass mat.

The layer of muscle and soft tissue is cast using liquid latex for surface which contains a filling of Flex Foam IT®. This is a product from Smooth-On, a company based in Pennsylvania, USA.

The layer of skin is cast in liquid Latex for surface and filled with Flex Foam IT as already described for the muscle and soft tissue layer.

Although the foregoing materials are provided for illustration, components of the simulator can be made of alternative materials. For example, an alternative embodiment would include one or more of all of the following materials:

The layer of bone mimetic can be made of any hard heat-resistant plastic that can also decrease the weight of the bone-mimetic.

In some embodiments it is desirable to avoid latex in the finished product. In that event, latex can be replaced with a Flexible Silicone Foam product from Smooth-On. This would eliminate the process of making a skin of latex then filling the void with Flex Foam IT, which is a urethane. It would be faster and as it is a silicone, it would be safer. The Flex Foam IT product comes in two weights and the 25 lb foam is used for the 2nd layer. Silc Pig® is a Smooth On pigment which can be added for good muscle and soft tissue color.

The skin layer can be made using Smooth-On's product Soma Foama®. The 15 lb foam would provide a soft material for the epidermis in a one stop casting method instead of two. A mesh of Tulle nylon Fabric patch embedded in the area to be incised and sutured would preferably be used.

Method

An anatomically correct and life sized model skeleton of the pelvis was used as both armature and shape and clay was modeled over this to simulate the hard tissue of the lower abdomen and pelvic. The shape was modeled to create a form that would be completely stable when placed on a work surface. The pelvic outlet was left void. At this stage an extension to the spinal column was modeled above L4/L5, but it is optional and need not be present.

Because the mold needs to pick up the detail through the outlet, a separate 'plug' mold can be used to avoid major undercuts and allow the finished cast to be taken from the mold without having to cut the mold. The interior of the mold with this outlet mold can be removed. It can stand separately and reflects the form of the sacrum. It can have a core for this separate outlet mold which allows the thickness of silicone to be ¼ inch without collapsing.

A wall of clay was formed a half inch round the floor of the sculpt where the silicone has been painted on the sculpt by using first a liquid mix and then a thickened mix pasted on to build ¼ inch thickness. The clay wall is removed after the silicone is set and a hard shell using AC 100 (Jesmonite) re-enforced with fiberglass mat. Care is taken when painting the still liquid AC100 round the contours of the dovetails. When hardened, the whole mold is turned upside down and the clay sculpt and plastic pelvic model are removed and cleaned. The rigid shell of the matrix mold and the silicone mold separated.

The bone mimetic layer is made of AC 100 (Jesmonite) re-enforced with fiberglass. FIGS. 18A, 18B and 18C show a sculpture of the muscles and soft tissue. The pelvic floor is in place but a channel is made so that the vagina, which is part of the stand-alone uterus, can be situated within the pelvic cavity adjacent the channel. The pelvic cavity is formed to be compatible with the uterus and an indication of the lower intestine is also included in the wall of the pelvis.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

The invention claimed is:

1. A simulator, comprising:
   a one-piece simulated uterus comprising a uterine fundus and body;
   a rigid hollow base having a recess in a support surface, wherein the recess is complementary to the shape of at least a portion of the uterine fundus and body for holding the simulated uterus to a portion of a posterior depth of the artificial uterus;
   a port in the base that can be selectively opened to permit the introduction of a liquid into the base, and selectively closed to retain the liquid within the base, to selectively increase a weight of the base to stabilize the base and simulated uterus in a desired position.

2. The simulator of claim 1, wherein the simulated uterus comprises a simulated gravid or post-partum uterus.

3. The simulator of claim 1, wherein the simulated uterus includes fallopian tubes projecting outwardly or laterally from the junction of the uterine fundus and body on the anatomical left and right sides of the simulated uterus.

4. The simulator of claim 1, wherein the simulated uterus further comprises at least a portion of a simulated isthmus of two fallopian tubes projecting outwardly from the junction of the uterine fundus and body on the anatomical left and right sides of the simulated uterus and the recessed support surface further comprises a recessed portion that is complementary to a shape of the simulated isthmus of the two fallopian tubes.

5. The simulator of claim 1, further comprising a fabric mesh in an anterior wall of the uterine body that facilitates repeated incision and suturing of the uterine body.

6. The simulator of claim 1, further comprising a simulated vagina extending from the body of the simulated uterus, and the recess in the support surface further comprises a portion complementary to the shape of at least a posterior portion of the simulated vagina.

7. The simulator of claim 1, wherein the simulated uterus comprises an elastomeric silicone rubber having that provides a texture of the simulated uterus similar to human tissue.

8. The simulator of claim 7, wherein the elastomeric silicone rubber comprises a platinum-catalyzed room temperature vulcanization silicone rubber having a Shore A durometer hardness 5 of less than 10.

9. The simulator of claim 1, wherein the simulated uterus contains no latex.

10. The simulator of claim 1, wherein the base is a substantially hollow enclosure and the support surface comprises a top surface of the base for supporting the simulated uterus, a substantially flat bottom surface, and a continuous sidewall that extends between the top and bottom surfaces, wherein the port is located in the sidewall and is selectively closable by a removable cap that mates with the port.

11. The simulator of claim 1, wherein the simulated uterus is bulb-shaped.

12. The simulator of claim 1, wherein the base comprises a rigid human abdominopelvic simulator that simulates a surface of a pelvic bone, sacrum and coccyx, a portion of the lumbar spine, hip joints and heads of the femurs.

13. The simulator of claim 1, further comprising an elastomeric covering of the rigid base comprising simulated muscles and soft tissue.

14. The simulator of claim 13, wherein the simulated soft tissue comprises a simulated layer of skin that has a Shore A hardness of less than the Shore A hardness of the simulated uterus.

15. The simulator of claim 1, wherein the simulated uterus has a Shore A hardness of 2.

16. The simulator of claim 1, further comprising a liquid in the base.

17. The simulator of claim 16 wherein the liquid is heated to a temperature at or above 25° C.

18. The simulator of claim 1 wherein the simulated uterus comprises a chemically cross-linked silicone rubber or polyurethane elastomer that transmits ultrasound or is ultrasound lucent.

19. The simulator of claim 18 wherein the simulated uterus has a hardness between Shore 00: 35 to Shore A: 10.

20. The simulator of claim 1 wherein the simulator is made of compressible material.

21. The simulator of claim 1 wherein the uterus comprises uterine arteries.

22. The simulator of claim 1 wherein where the uterus comprises an anterior cervical lip.

* * * * *